(12) United States Patent
Levin

(10) Patent No.: US 9,366,830 B2
(45) Date of Patent: Jun. 14, 2016

(54) HYBRID FERRULE AND FIBER OPTICAL TEST DEVICE

(71) Applicant: Lifodas, UAB, Vilnius (LT)

(72) Inventor: Piotr Anatolij Levin, Vilnius (LT)

(*) Notice: Subject to any disclaimer, the term of this patent is extended or adjusted under 35 U.S.C. 154(b) by 0 days.

(21) Appl. No.: 14/055,815

(22) Filed: Oct. 16, 2013

(65) Prior Publication Data

US 2014/0241668 A1 Aug. 28, 2014

Related U.S. Application Data

(60) Provisional application No. 61/770,839, filed on Feb. 28, 2013.

(51) Int. Cl.
*G02B 6/38* (2006.01)

(52) U.S. Cl.
CPC ............ *G02B 6/3885* (2013.01); *G02B 6/3818* (2013.01); *G02B 6/3863* (2013.01)

(58) Field of Classification Search
CPC .... G02B 6/3818; G02B 6/3863; G02B 6/3885
USPC ...................................... 385/60, 78
See application file for complete search history.

(56) References Cited

U.S. PATENT DOCUMENTS

| | | | |
|---|---|---|---|
| 5,082,378 A * | 1/1992 | Muller et al. .................... 385/72 |
| 5,214,730 A * | 5/1993 | Nagasawa et al. ............... 385/59 |
| 5,245,684 A * | 9/1993 | Terao et al. ...................... 385/78 |
| 5,432,880 A * | 7/1995 | Diner ............................... 385/85 |
| 6,012,852 A * | 1/2000 | Kadar-Kallen et al. ......... 385/74 |
| 6,126,519 A * | 10/2000 | Minami et al. .................... 451/41 |
| 6,416,236 B1 * | 7/2002 | Childers et al. .................. 385/84 |
| 6,540,411 B1 * | 4/2003 | Cheng ............................. 385/79 |
| 6,760,516 B2 * | 7/2004 | Brun et al. ...................... 385/34 |
| 6,877,909 B2 * | 4/2005 | Fleenor ................. B24B 19/226 385/78 |
| 6,899,466 B2 * | 5/2005 | Manning et al. ................ 385/78 |
| H002141 H * | 1/2006 | Kevern et al. .................... 385/72 |
| 2002/0081067 A1 * | 6/2002 | Brun et al. ...................... 385/34 |
| 2004/0120654 A1 * | 6/2004 | Kevern ........................... 385/78 |
| 2004/0179788 A1 * | 9/2004 | Fleenor ................. B24B 19/226 385/79 |
| 2004/0234204 A1 * | 11/2004 | Brun et al. ...................... 385/39 |
| 2005/0180702 A1 * | 8/2005 | Kevern et al. .................... 385/93 |
| 2011/0026884 A1 * | 2/2011 | Hikosaka ........................ 385/72 |
| 2013/0163930 A1 * | 6/2013 | Jian ................................ 385/60 |

* cited by examiner

*Primary Examiner* — Peter Radkowski
(74) *Attorney, Agent, or Firm* — Michael J. Persson; Cahterine E. Napjus; Lawson Persson Weldon-Francke

(57) ABSTRACT

The present invention is a hybrid ferrule which is able to be connected to both, angle polished and flat polished, MPO connectors; a test device including the above mentioned hybrid ferrule; and a test kit, including the above mentioned test device with hybrid ferrule. The hybrid ferrule of the present invention includes first, second, and third surfaces which are designed in a special way to ensure the high quality connection with SM or MM type connectors. A hybrid fiber connector having an integrated end, a connection end, two sides, a flat center, and an optical fiber embedded in the flat center parallel to and halfway between the two sides. The connection end includes left and right edges and first, second, and third surfaces. The first surface angles upward from said left edge of said connection end to a first point, the second surface extends flat between the first point and a second point, and a third surface angles downward between the second point and the right edge of said connection end.

9 Claims, 9 Drawing Sheets

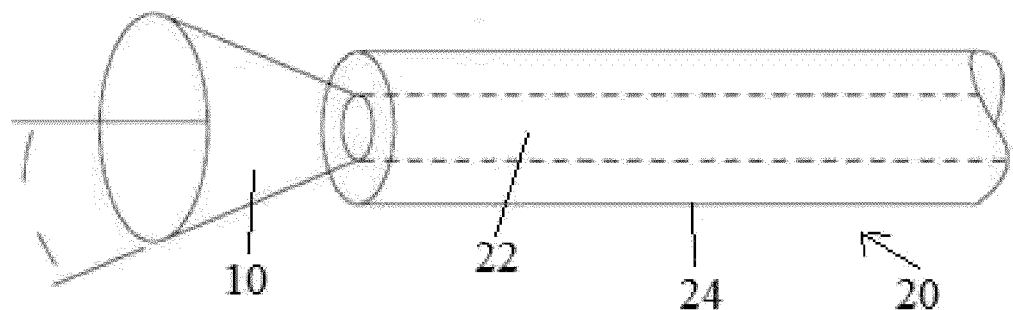
FIG. 2
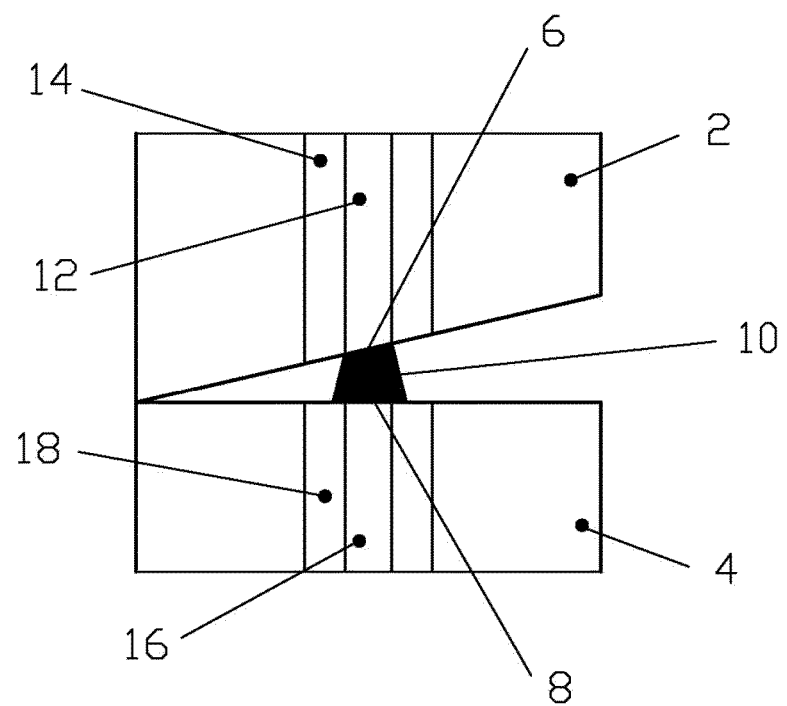
FIG. 3 / PRIOR ART

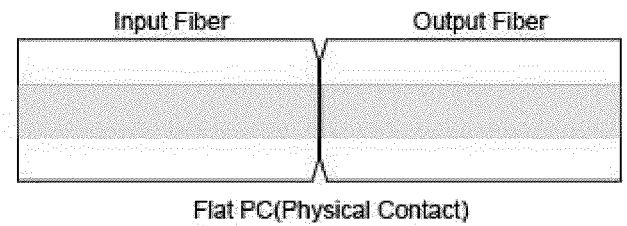
FIG. 4A / PRIOR ART
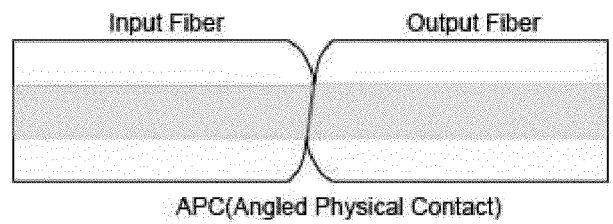
FIG. 4B / PRIOR ART
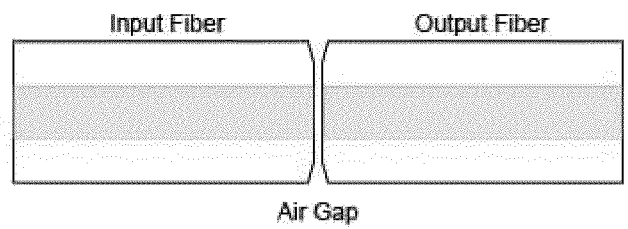
FIG. 4C / PRIOR ART
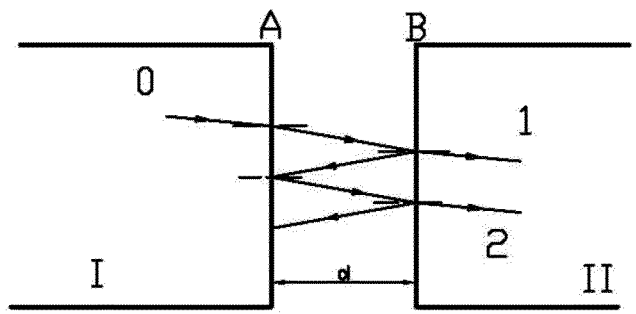
FIG. 4D

HYBRID FERRULE AND FIBER OPTICAL TEST DEVICE

CLAIM OF PRIORITY

This patent application is a non-provisional patent application claiming the benefit of priority of U.S. Provisional Patent Application Ser. No. 61/770,839, filed on Feb. 28, 2013.

FIELD OF THE INVENTION

The present invention relates to polished multiple-fiber push-on/pull-off (MPO/MTP) type fiber optical connectors and, in particular, to hybrid ferrules used in test devices, which can be connected with angled and/or flat fiber optic connectors.

BACKGROUND

To transfer the optical signal from one fiber cable to another one, the output and input cables' ends must be attached to output and input connectors of appropriate types; for example: males and/or females. Depending on the output signal type Single Mode (SM) or Multi Mode (MM), the appropriate input connector must be used. Currently, the main problem is that, for different types of output connectors, people use the appropriate different types of input connectors because the geometry of output connectors are different.

In a typical MPO type connector, up to twelve fibers in a ribbon are stripped to 125 µm cladding and inserted into 250 µm spaced parallel alignment holes. The ferrule also typically includes two 0.7 mm diameter holes, running parallel to the fibers on the outer side of the ferrule. These two holes hold precision metal guide pins which align the fibers with tight tolerances. MPO type connectors may be male and female; male connectors have two guide pins and female connectors do not. Because typical MPO connectors are trying to align so many fibers at once, their coupling loss are typically larger than single fiber connectors.

FIGS. 1A and 1B represent the current technical level, in which we see the male type connector (1A) and the female type connector (1B). The surfaces of the appropriate ferrules (94 and 94) of the connectors (88 and 90), after they are connected, must be parallel and in strong coincidence with each other. If a MM type signal is used, the surfaces of each ferrule (92, 94) are parallel to each other, are flat and perpendicular to the direction of the signal propagation. If a SM type signal is used, the surfaces of each ferrule (92, 94) are parallel to each other, are flat, but are slightly angled/wedged 8 degrees toward the direction of the signal propagation. However, the main problem in practice is, that for each type of signal (for example: MM, SM), a different type of ferrule (94) has to be used. Current technology does not include a ferrule having a geometry that could be suitable for both types (MM and SM) of signal going from output fiber.

Looking at the current technology in more detail, there are two basic ferrule types for MPO connectors; a flat polished ferrule that is perpendicular to the direction of the light propagation and a flat and angled polished ferrule that is angled to the direction of the light propagation. The flat and perpendicular ferrule is used in case of MM signal fibers, which may be referred to as a MM type ferrule. The flat and angled/wedged angle ferrule is used in case of SM signal fibers, which may be referred to as a SM type ferrule. The wedged surface of the ferrule is disposed at an 8° angle, which is designed to minimize the signal reflections. Respectively, the connectors in which MM type ferrules are used are called as MM type connectors, and the connectors in which SM type ferrules are used are called SM type connectors. Also, by functionality, the connectors can be divided to "output" and "input". In current technology, the angled (SM type) and flat (MM) polished connectors are not designed to be connected to each other. Connecting a flat polished ferrule to an angle polished ferrule results in high losses of the optical signal intensity and risk of mechanical damage of the surfaces of the ferrules.

There are used two main parameters related to losses in fiber optical connectors: insertion losses and reflection losses. Insertion losses refer to the loss of signal, or reduction of its intensity, at the entrance of the connection and is normally specified in decibels (dB). Insertion losses should be low; typically a few hundredths to a few tenths of a dB. Reflection losses refer to the amount of tight reflected back to the originating source or to the environment around. Reflection losses should be as low as possible indicating a small amount of light being reflected back. Reflections of light can cause damage in the transmission system and in testing optical systems. Typical reflection losses specifications range from minus 20 to minus 65 the values depend on fiber and connector type.

The losses inherent in the connection of flat polished to angle polished ferrules are largely due to the alignment of the optical fiber, whose end is embedded in the ferrule of the connector. FIG. 2 shows a perspective diagram depicting a light acceptance cone (10) being released from an optical fiber (20) with core (22) and cladding (24). FIG. 3 shows an angle polished ferrule (2) being connected to a flat polished ferrule (4). Angle polished ferrule (2) includes an optical fiber with core (12) and cladding (14), ending in fiber end (6). Flat polished ferrule (4) includes an optical fiber with core (16) and cladding (18), ending in fiber end (8). Light is being released from the core (12) in fiber end (6) embedded in angle polished ferrule (2) into the fiber end (8) embedded in flat polished ferrule (4). As shown in FIG. 3, the wider end of light acceptance cone (10), formed out of fiber end (6), is wider than fiber end (8), causing substantial insertion losses at the entrance of the connection.

To avoid such situations, it is common for flat polished connectors to mate with connectors with flat ferrules, as shown in FIG. 4A and angle polished connectors to mate with connectors with angled ferrules, as shown in FIG. 4B. In scenarios such as those shown in FIGS. 4A and 4B, the ferrules are in physical contact, so the cores of the optical fibers within each of the connecting ferrules may be the same size without substantial insertion loss because the light being released from one fiber end will not form a substantial light acceptance cone, but rather will directly enter the connecting fiber end. In some cases, physical contact between the ferrules is undesirable as it may abrade the ferrule ends, which may cause distorted measurements.

Although FIGS. 4A and 4B show actual physical contact between the connectors, there may also be a gap between the connectors, as shown in FIG. 4C. Having a gap avoids issues caused by physical contact between the ferrules, as discussed above. In scenarios that include a gap, as shown in FIG. 4C, the core of the optical fiber that receives light at the connection must be at least as wide as the light acceptance cone produced by the releasing fiber end at the light acceptance cone's widest point, where it meets the fiber end of the optical fiber accepting the light, to avoid substantial insertion loss. Thus, the distance between the fibers must be relatively small. FIG. 4D shows the result when the distance d between two flat polished connectors is too large. In FIG. 4D, the light 0 from output fiber 1 passes through fiber end A toward the fiber end B of input fiber II. A portion 1 of the light 0 passes through fiber end B and into input fiber II, and a portion is reflected off of fiber end B. This light then reflects back off of fiber end A toward fiber end B, where still another portion 2 passes into the input fiber II. Such reflections cause signal interference and result in distorted measurements. To avoid interference between portions of light 2 and 1, the angle between them must be large enough. To fulfill this condition, the surface of one of the fiber is wedged. However it results in potential abrasion problems.

There are some applications where it is necessary, using one universal input connector, to make a connection with output connector of any type (SM or MM). A primary example of such an application is a field of testing equipment. Such mentioned one universal input connector can reduce the cost of all testing equipment and simplify the testing process itself. Therefore there is a need for a hybrid ferrule that is able to be connected to both, angle polished and flat polished, MPO connectors while, at the same time, minimizing insertion and reflection losses.

SUMMARY OF THE INVENTION

The present invention is a hybrid ferrule having a geometry that allows it to be able to be connected to both, angle polished and flat polished, MPO connectors and a test device, including the hybrid ferrule of the present invention.

The hybrid ferrule of the present invention includes first, second, and third surfaces which are designed in a special way to guaranty the high quality connection with both SM and MM type connectors. The hybrid ferrule contains first, second, and third surfaces, which are disposed in order from left to right as one faces the hybrid ferrule, as shown in several of the figures and, in particular, in FIG. 5 referenced below. It is understood that if the ferrule is flipped over, the first, second, and third surfaces are disposed in order from right to left. All references below, such as to the left or right of the hybrid ferrule, are consistent with the views of the ferrule depicted in the FIG. 5.

When the hybrid ferrule is intended to be connected to a MM type connector, the first surface doesn't play any functional role, the second surface is attached to the cladding/connector of the MM type ferrule, and the third surface receives the optical signal from the fiber of the MM type connector. The roles of all these surfaces of hybrid ferrule in MM type connector configuration are described in more detail below. When the hybrid ferrule is connected to a SM type connector, the first surface is angled at the same angle as the surface of the SM ferrule, to completely accommodate with the angle polished ferrule, the second surface is placed at the defined distance to the surface of the SM type ferrule, and the third surface receives the optical signal from the fiber of the SM type connector. The roles of all these surfaces of the hybrid ferrule in a SM type connector configuration are described in more details below. Accordingly, the same geometry of the hybrid ferrule of the present invention is suitable to be used for both configurations: with MM and SM type connectors.

The first surface angles up from the left edge of the hybrid ferrule, and is angled so as to accommodate angle polished connectors. The second surface begins at a first point, which is the upper end of the first surface, and is flat so as to accommodate flat polished connectors. The second surface and its flat angle is therefore a means for mating with a flat polished connector. The first and second surfaces are both disposed to the left of the leftmost edge of the cladding of the fiber end. The third surface begins at a second point, which is the right end of the second surface, and slopes downward to the right edge of the hybrid ferrule. The first surface angles up at the same angle as a typical angle polished connector, commonly eight degrees (8°). The first surface and its angle are therefore a means for mating with an angle polished connector. The third surface angles down at an appropriate angle to eliminate multiple reflections. When considered as a cross section, the left side of the cladding of the optical fiber whose fiber end is embedded in the center of the hybrid ferrule is disposed proximate to and to the right of the second point. The core of the fiber end embedded in the hybrid ferrule is in the exact center of the hybrid ferrule.

When the hybrid ferrule of the present invention is mated with an angle polished or flat polished MPO connector, there is a gap between the fiber end of the hybrid ferrule and the fiber end of the MPO connector. The gap is triangular in shape, with a smaller angle between the hybrid ferrule and a flat polished connector than between the hybrid ferrule and an angle polished connector. Therefore the distance between the fiber end of a flat polished ferrule and the hybrid ferrule is less than the distance between the fiber end of an angle polished connector. This also means that the widest point of the light acceptance cone created by light released from an angle polished connector is wider than the widest point of the light acceptance cone created by light released from a flat polished connector. The core of the optical fiber whose fiber end is embedded in the hybrid ferrule of the present invention is therefore at least as wide as the widest point of the light acceptance cone created by light released from an angle polished connector. This ensures no insertion loss whether the hybrid ferrule is being connected to a flat or angled polished ferrule. The core of the hybrid ferrule is larger than standard ferrule cores at 0.0625 mm, so as to ensure no insertion loss. Such a large core could run the risk of inviting reflections, akin to portion 2 as shown in FIG. 4D, thus causing distorted measurements. The angle of the third surface of the hybrid ferrule, however, is such that any such reflections between the hybrid ferrule and a fiber end to be tested, whether that fiber end includes a flat or angled polished ferrule, will encounter the hybrid ferrule outside of even the larger core used with the hybrid ferrule. The third surface and its angle are therefore a means for avoiding the measurement of unwanted light reflections.

The test device of the present invention includes an MPO connector capable of mating with an MPO connector that terminates a fiber optic cable to be tested, where the MPO connector of the test device includes a hybrid ferrule of the present invention, as described above, so that the test device of the present invention may test fiber optic cables terminating in MPO connectors including either flat or angle polished ferrules.

Therefore it is an aspect of the present invention to provide a hybrid ferrule for use in an MPO connector that allows the MPO connector including the hybrid ferrule to be connected to MPO connectors including either flat or angle polished ferrules.

It is a further aspect of the present invention to provide a test device including an MPO connector including the hybrid ferrule.

These aspects of the present invention are not meant to be exclusive and other features, aspects, and advantages of the present invention will be readily apparent to those of ordinary skill in the art when read in conjunction with the following description and accompanying drawings.

BRIEF DESCRIPTION OF THE DRAWINGS

FIG. 2 is a perspective diagram of a light acceptance curve being released from an optical fiber.

FIG. 3 is a prior art depiction of an angle polished ferrule being connected to a flat polished ferrule.

FIG. 4A is a prior art depiction of two flat polished MPO connectors in physical contact with one another.

FIG. 4B is a prior art depiction of two angle polished MPO connectors in physical contact with one another.

FIG. 4C is a prior art depiction of two flat polished MPO connectors with a gap between them.

FIG. 4D is a light path diagram showing reflection from the surface of one prior art flat polished MPO connector back through another flat polished MPO connector.

DETAILED DESCRIPTION

Figure 1A:
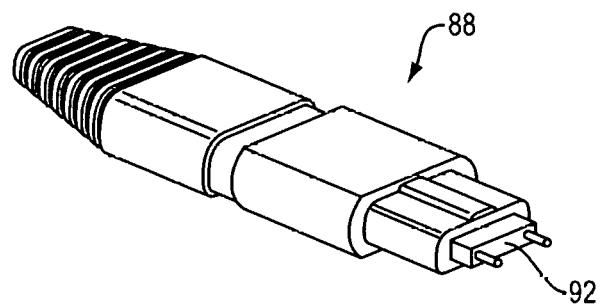
FIG. 1A is a perspective view of a male MPO connector.
Figure 1B:
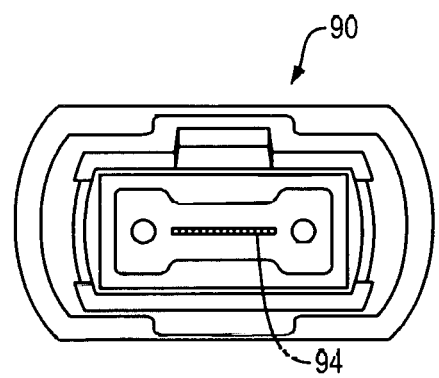
FIG. 1B is a perspective view of a female MPO connector.
Figure 5:
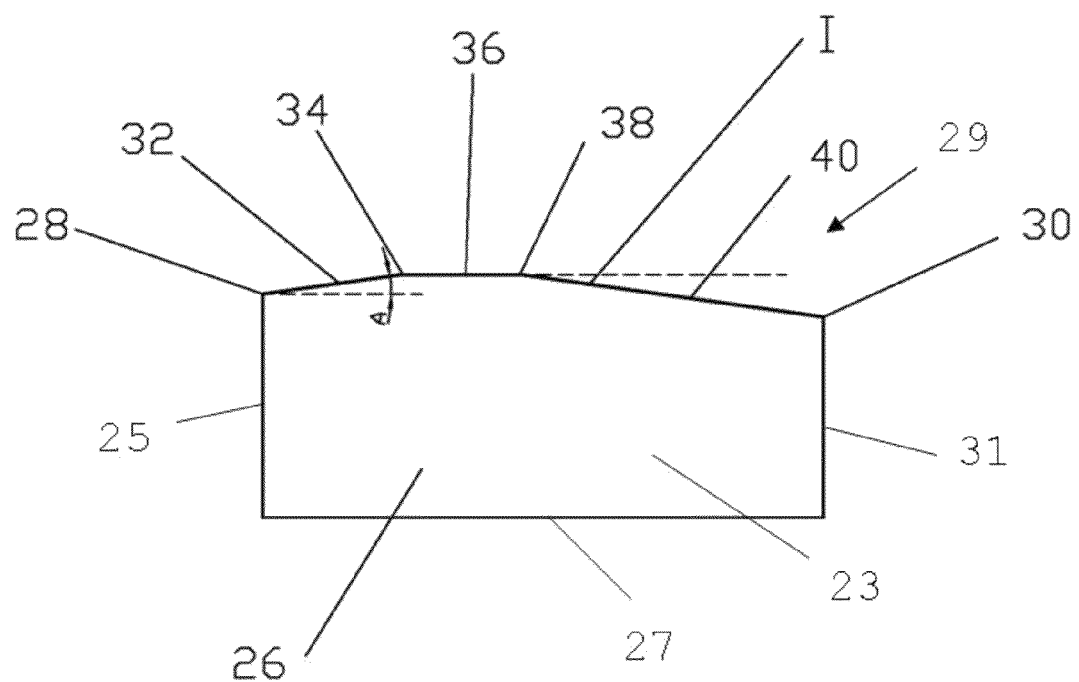
FIG. 5 is a top down view of a hybrid ferrule of the present invention.

Referring first to FIG. 5, a top down view of hybrid ferrule (26) of the present invention is shown. Hybrid ferrule (26) has integrated end (27), connection end (29), right side (31), left side (25), flat center (23), left edge (28), right edge (30), and first point (34) and second point (38) are between left edge (28) and right edge (30). Connection end (29) is connected to another ferrule during testing. Integrated end (27) is the opposite end of connection end (29) and is incorporated into a test device. Flat center (23) is defined by connection end (29), integrated end (27), right side (31), and left side (25). First surface (32) angles up from left edge (28) on left side (25) to first point (34). Angle A, between first surface (32) and the dashed line on the left is approximately eight degrees (8°). First surface (32) and angle A are means for mating with an angle polished connector (33) indicated in FIG. 7A. Second surface (36) is flat between first and second points (34, 38). Second surface (36) and its flat angle is means for mating with a flat polished connector (35). Third surface (40) angles down from second point (38) to right edge (30) on right side (31) at angle I, which in this depiction is also eight degrees (8°), and is shown between the dashed line on the right and third surface (40). It is understood that angle I is at any angle that eliminates multiple reflections and is preferably between two degrees (2°) and twelve degrees (12°). Because third surface (40) is longer than first surface (32), even though both sides slope at angle A, left edge (28) is disposed higher on hybrid ferrule (26) than right edge (30). Third surface (40) and angle I are means for avoiding the measurement of unwanted light reflections (41), such as portion (2), shown in FIG. 4D.

Figure 6A:
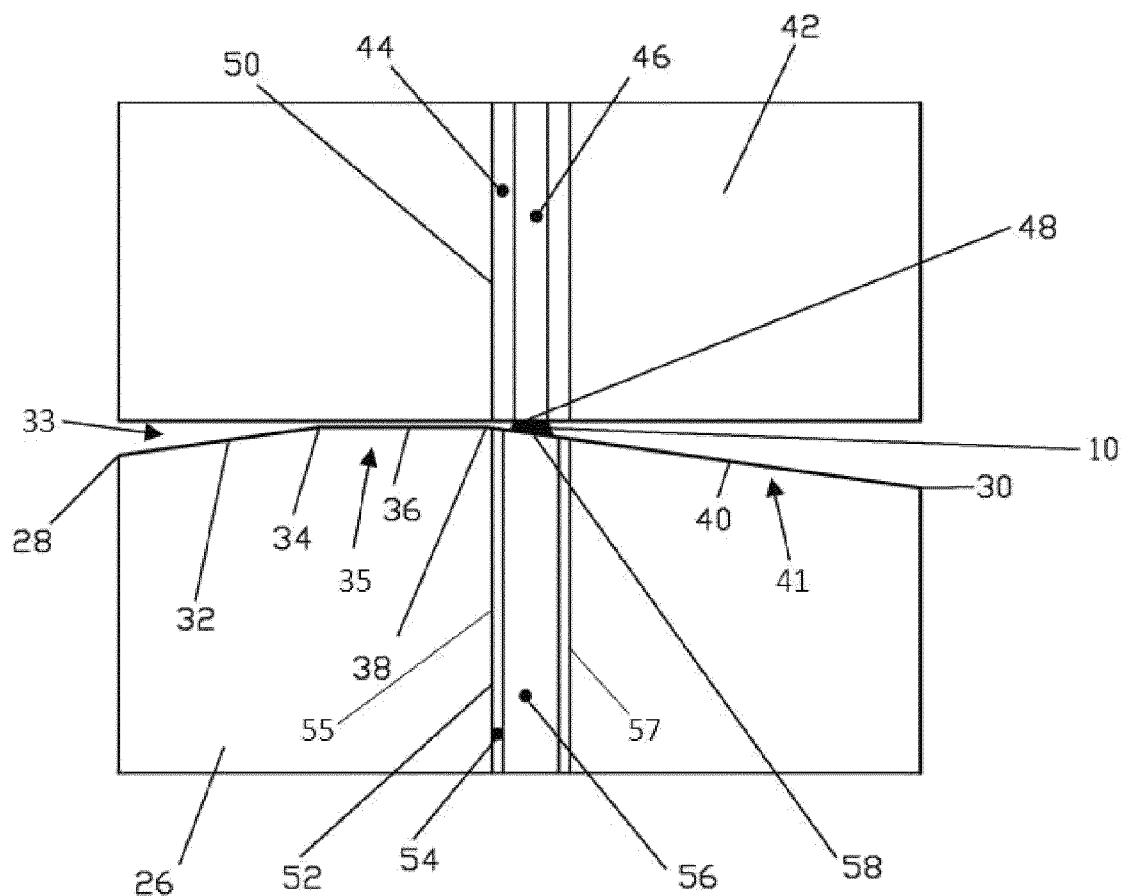
FIG. 6A is a top down view of a hybrid ferrule of the present invention being connected to a flat polished ferrule.
Figure 6B:
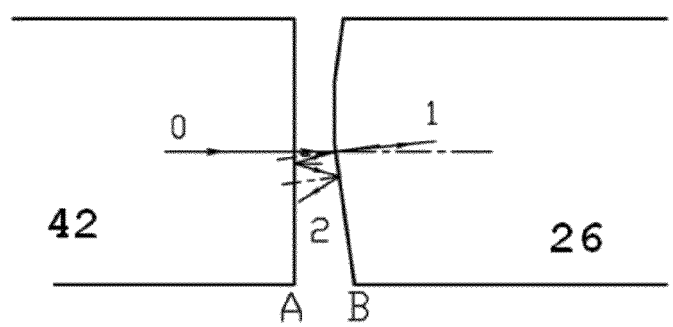
FIG. 6B is a light path diagram showing the light reflection path between the ferrules of FIG. 6A.

Now referring to FIGS. 6A and 6B, hybrid ferrule (26) is shown being connected to flat polished ferrule (42). Optical fiber (52) is shown embedded in hybrid ferrule (26). Optical fiber (52) includes core (56), cladding (54), and fiber end (58). Cladding (54) has leftmost edge (55) and rightmost edge (57). Both first and second surfaces (32, 36) are disposed to the left of leftmost edge (55) of cladding (54). Core (56) is approximately 0.0625 mm. As shown in FIG. 6A, flat polished ferrule (42) also includes an embedded optical fiber (50). Optical fiber (50) includes core (46), cladding (44), and fiber end (48). Flat polished ferrule (42) meets hybrid ferrule (26) at second surface (36). As shown in FIG. 6B, light (0) passes from flat polished ferrule (42) through the end A of the ferrule (42). A portion (1) of light (0) passes through the end B of hybrid ferrule (26) and a portion (2) is reflected off end B. However, this light is not reflected back within the light acceptance cone and does not enter end B of hybrid ferrule (26).

Figure 7A:
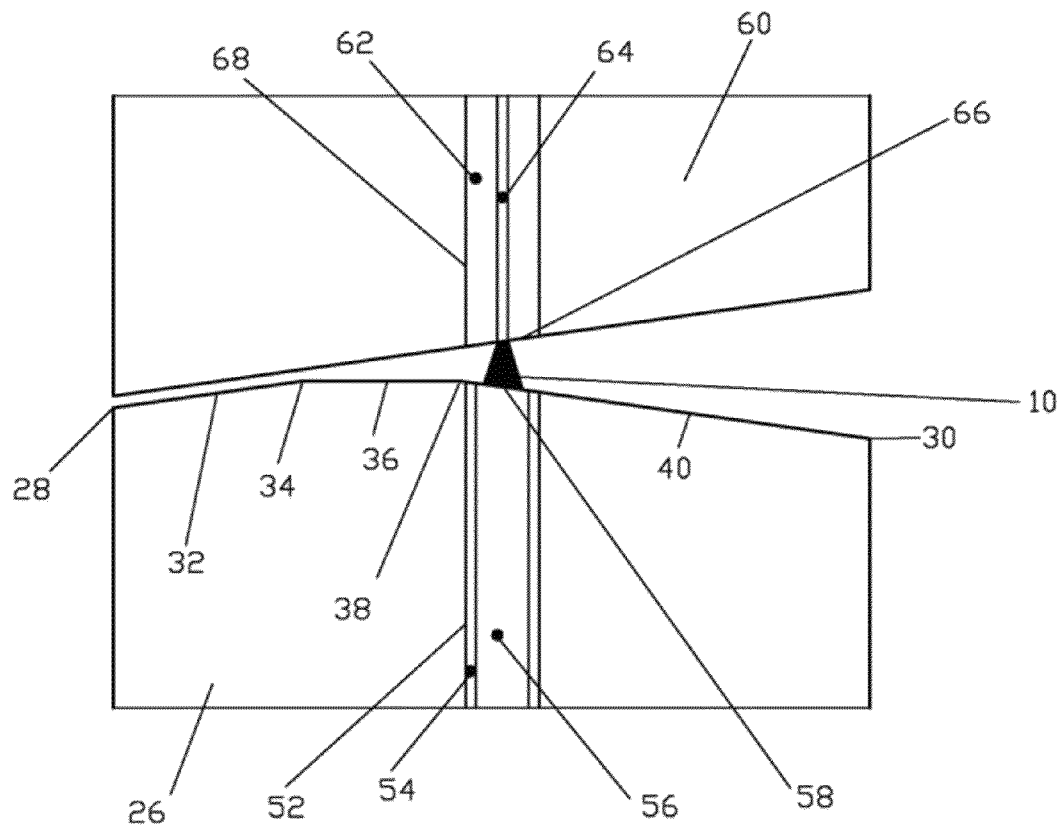
FIG. 7A is a top down view of a hybrid ferrule of the present invention being connected to an angled polished ferrule.
Figure 7B:
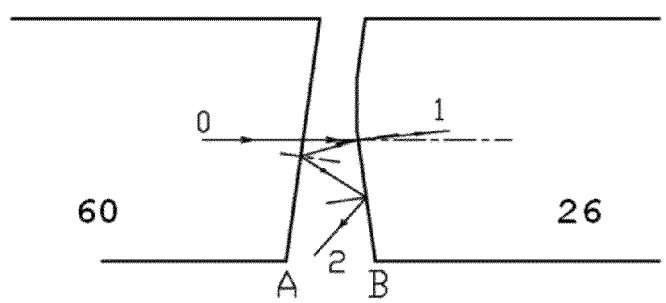
FIG. 7B is a light path diagram showing the light reflection path between the ferrules of FIG. 7A

Now referring to FIGS. 7A and 7B, hybrid ferrule (26) is shown being connected to angle polished ferrule (60). As shown in FIG. 7A, angle polished ferrule (60) also includes an embedded optical fiber (68). Optical fiber 68 includes core (64), cladding (62), and fiber end (66). As discussed in more detail below with reference to FIGS. 8A and 8B, core (56) of optical fiber (52) embedded in hybrid ferrule (26) is significantly wider than core (46) of optical fiber (50) embedded in flat polished ferrule (42) or core (64) of optical fiber (64) embedded in angle polished ferrule (60). Each of the light acceptance cones (10) shown in FIGS. 6A and 7A are narrower at their widest points than the width of core (56) of hybrid ferrule (26). As shown in FIG. 7B, light (0) passes from angle polished ferrule (60) through the end A of the ferrule (60). A portion (1) of light (0) passes through the end B of hybrid ferrule (26) and a portion (2) is reflected off end B. However, this light is not reflected back within the light acceptance cone and does not enter end B of hybrid ferrule (26).

Figure 8A:
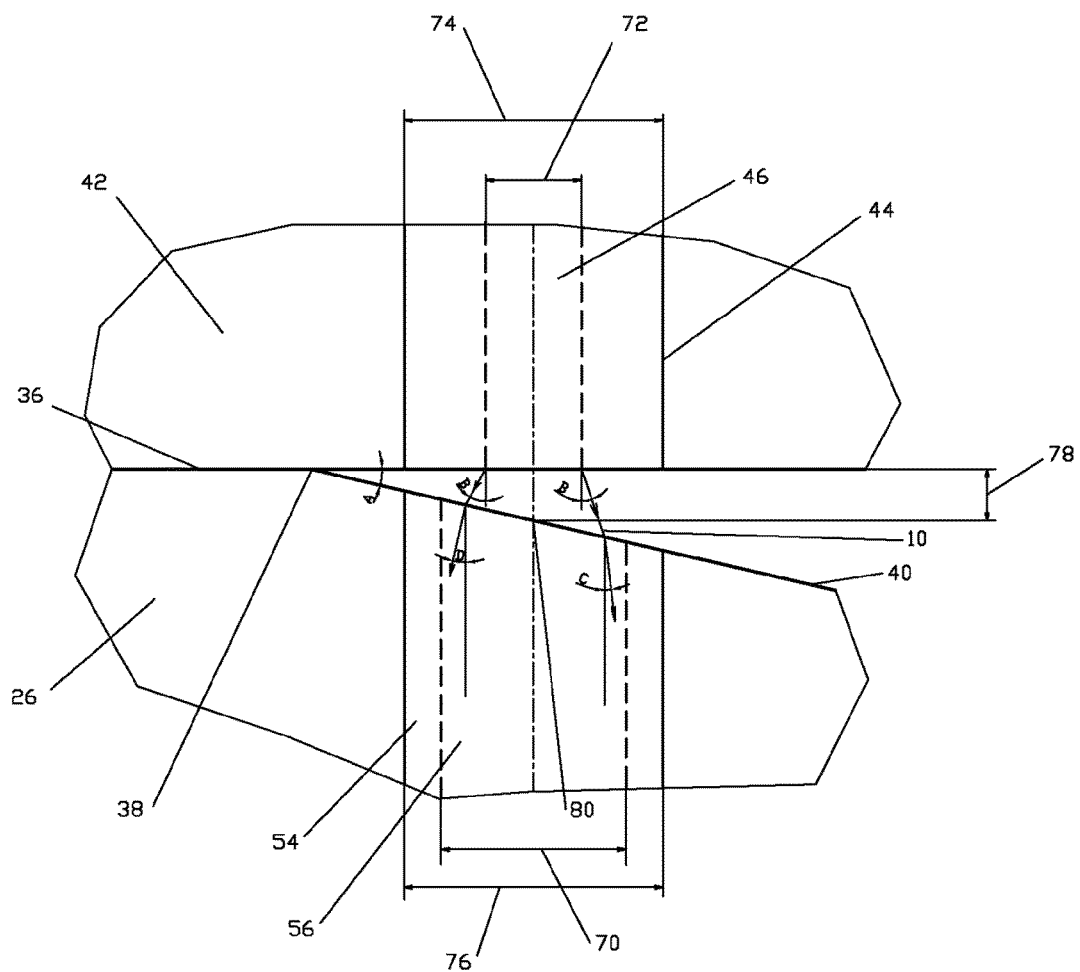
FIG. 8A is a blown up schematic showing angles of created by a light acceptance cone formed by light being released from a flat polished ferrule into a hybrid ferrule of the present invention.
Figure 8B:
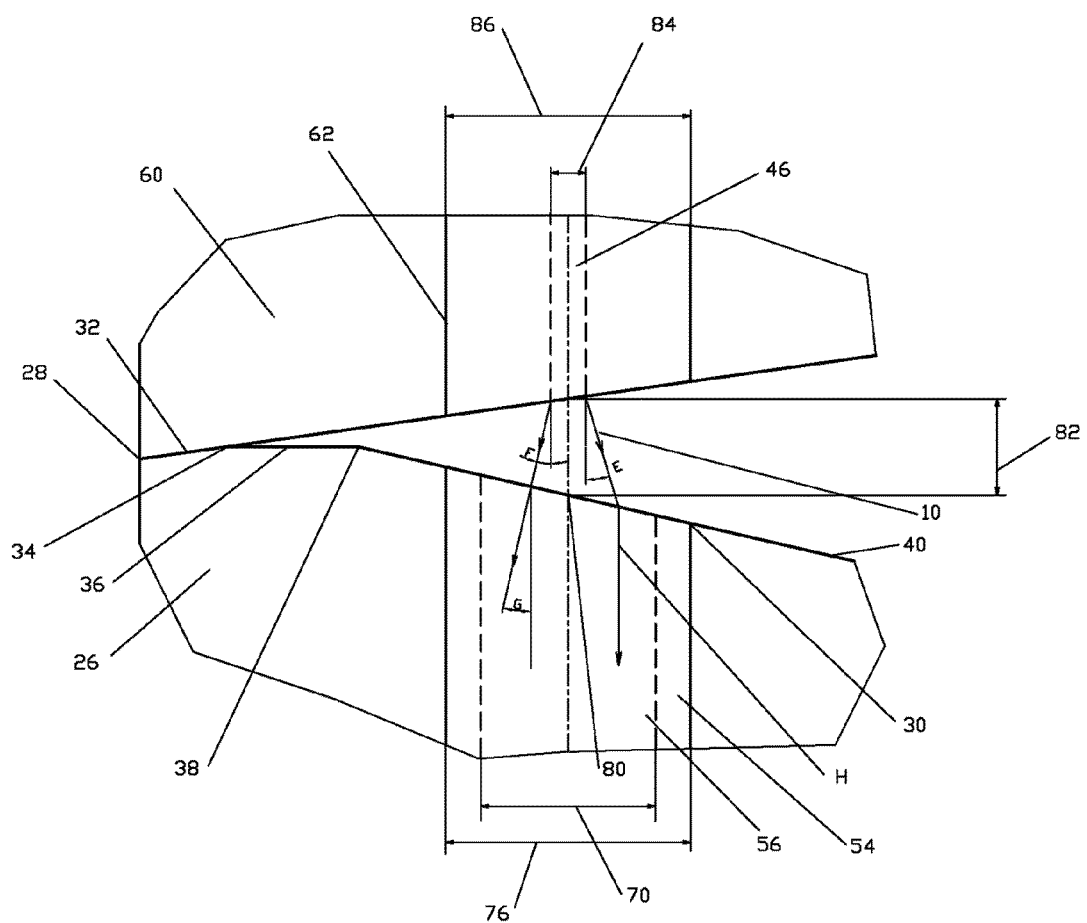
FIG. 8B is a schematic showing angles of created by a light acceptance cone formed by light being released from an angle polished ferrule into a hybrid ferrule of the present invention.

Now referring to FIGS. 8A and 8B details involving the angles of light acceptance cones (10) are shown. FIG. 8A shows light acceptance cone (10) being released from flat polished ferrule (42). Light acceptance cone (10) is released from core (46) at angle B. Angle B is eleven and five tenths degrees (11.5°). When light acceptance cone (10) encounters third surface (40) of hybrid ferrule (26), the light is refracted at angle D on the left and angle C on the right. Angle D is ten and three tenths degrees (10.3°). Angle C is four and nine tenths degrees (4.9°). Flat polished ferrule (42) has core diameter (72) and cladding diameter (74). Hybrid ferrule (26) has core diameter (70) and cladding diameter (76). Cladding diameters (74, 76) are the same at 0.125 mm. Core diameter (72) at 0.0625 mm is significantly less than core diameter (70) at 0.100 mm. This disparity allows core (56) of hybrid ferrule (26) to receive the entire light acceptance cone (10) with minimal insertion loss. Third point (80) is the center point of core (56) of hybrid ferrule (26). Distance (78) is 0.011 mm, which is the distance between third point (80) and the center point of core (46) of flat polished ferrule (42).

FIG. 8B shows light acceptance cone (10) being released from angle polished ferrule (60). Light acceptance cone (10) is released from core (64) at angle F on the left and angle E on the right. Angle F is 12°. Angle E is 4°. When light acceptance cone (10) encounters third surface (40) of hybrid ferrule (26), the light is refracted at angle G on the left and angle H on the right. Angle G is 10.7°. Angle H, included for the sake of completion, is 0°. Angle polished ferrule (60) has core diameter (84) and cladding diameter (86). Hybrid ferrule (26) has core diameter (70) and cladding diameter (76). Cladding diameters (86, 76) are the same at 0.125 mm. Core diameter

(84) at 0.009 mm is significantly lesser than core diameter (70) at 0.100 mm. This disparity allows core (56) of hybrid ferrule (26) to receive the entire light acceptance cone (10) with minimal insertion loss. Third point (80) is the center point of core (56) of hybrid ferrule (26). Distance (82) is 0.101 mm, which is the distance between third point (80) and the center point of core (64) of angle polished ferrule (60).

Figure 9:
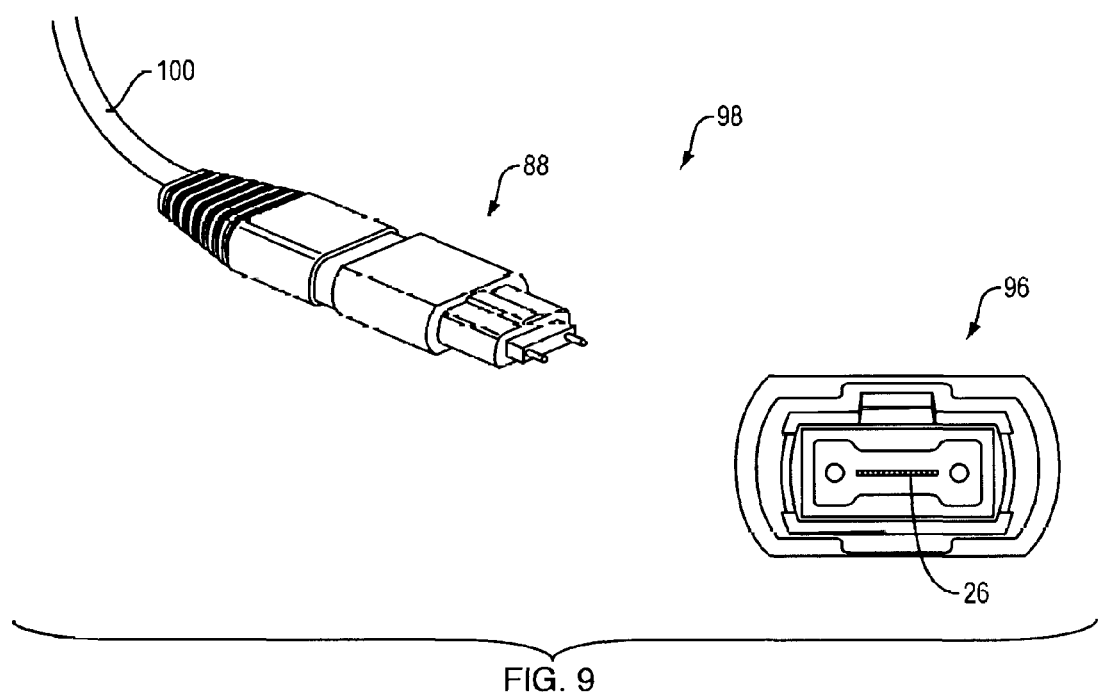
FIG. 9 is a perspective view of the test device of the present of the present invention and MPO connector containing a fiber to be tested.

Now referring to FIG. 9, test kit (98) is shown. Test kit (98) includes test device (96) and male MPO connector (88) with fiber optic cable (100) to be tested. Test device (96) includes hybrid ferrule (26), so that fiber optic cable (100) may be tested whether it includes a flat polished ferrule or an angle polished ferrule.

Although the present invention has been described in considerable detail with reference to certain preferred versions thereof, other versions would be readily apparent to those of ordinary skill in the art. Therefore, the spirit and scope of the description should not be limited to the description of the preferred versions contained herein.

I claim:

1. A hybrid ferrule capable of being connected to both angle polished and flat polished MPO connectors, wherein said hybrid ferrule comprises:
    an integrated end;
    a connection end;
    two sides;
    a flat center bounded by said integrated end, said connection end, and said two sides; and
    an optical fiber embedded in said flat center parallel to and halfway between said two sides, wherein said optical fiber comprises a cladding, a core, and a fiber end at said connection end;
    wherein said connection end comprise a left edge, a right edge, a first surface, a second surface and a third surface;
    wherein said first surface angles upward in a non-curved line from said left edge of said connection end to a first point;
    wherein said second surface extends flat in a straight line between said first point and a second point and is perpendicular to said two sides and said optical fiber;
    wherein said third surface angles downward in a non-curved line between said second point and said right edge of said connection end; and
    wherein both of said first surface and said second surface of said connection end are disposed to the left of a leftmost edge of said cladding of said optical fiber where said cladding intersects said connection end.

2. The hybrid ferrule as claimed in claim 1, wherein said first surface of said connection end angles upward so as to accommodate an angle polished ferrule.

3. The hybrid ferrule as claimed in claim 2, wherein said first surface of said connection end angles upward at substantially 8°.

4. The hybrid ferrule as claimed in claim 1, wherein said third surface of said connection end angles downward between 2 and 12°.

5. The hybrid ferrule as claimed in claim 4, wherein said third surface of said connection end angles downward at substantially 8°.

6. The hybrid ferrule as claimed in claim 1, wherein said core of said optical fiber is substantially 0.0625 mm.

7. A hybrid ferrule able to be connected to both angle polished and flat polished MPO connectors, wherein said hybrid ferrule comprises:
    an integrated end;
    a connection end;
    two sides;
    a flat center bounded by said integrated end, said connection end, and said two sides;
    an optical fiber embedded in said flat center parallel to and halfway between said two sides, wherein said optical fiber comprises a cladding, a core, and a fiber end at said connection end;
    an angled first surface disposed on said connection end in a non-curved line;
    a flat second surface disposed on said connection end, wherein said second surface is perpendicular to said two sides and said optical fiber; and
    an angled third surface disposed on said connection end in a non-curved line;
    wherein both of said first surface and said second surface of said connection end are disposed to the left of a leftmost edge of said cladding of said optical fiber where said cladding intersects said connection end.

8. The hybrid ferrule as claimed in claim 7, wherein unwanted light reflections are avoided when said hybrid ferrule is connected to an angle polished MPO connector through said first surface.

9. The hybrid ferrule as claimed in claim 7, wherein unwanted light reflections are avoided when said hybrid ferrule is connected to a flat polished MPO connector through said second surface.

* * * * *